United States Patent
Cho et al.

(10) Patent No.: US 8,630,217 B2
(45) Date of Patent: Jan. 14, 2014

(54) WIRELESS COMMUNICATIONS TERMINAL HAVING RF DIRECT WAKEUP FUNCTION AND WAKEUP METHOD THEREOF

(75) Inventors: Han Jin Cho, Seoul (KR); Jae Hyung Lee, Gyunggi-do (KR); Myeung Su Kim, Gyunggi-do (KR); Joon Hyung Lim, Gyunggi-do (KR); Tah Joon Park, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 74 days.

(21) Appl. No.: 13/342,676

(22) Filed: Jan. 3, 2012

(65) Prior Publication Data

US 2013/0107775 A1    May 2, 2013

(30) Foreign Application Priority Data

Oct. 28, 2011   (KR) ........................ 10-2011-0111495

(51) Int. Cl.
*H04W 52/02* (2009.01)

(52) U.S. Cl.
USPC ........................................................ 370/311

(58) Field of Classification Search
USPC ....... 455/550.1; 340/10.33; 705/26; 370/311, 370/338
See application file for complete search history.

(56) References Cited

U.S. PATENT DOCUMENTS

| | | | | |
|---|---|---|---|---|
| 6,150,948 | A * | 11/2000 | Watkins | 340/693.3 |
| 2006/0030353 | A1* | 2/2006 | Jun | 455/550.1 |
| 2006/0202804 | A1* | 9/2006 | Vijay-Pillai et al. | 340/10.33 |
| 2007/0140199 | A1* | 6/2007 | Zhao et al. | 370/338 |
| 2011/0194471 | A1* | 8/2011 | Kim et al. | 370/311 |
| 2013/0039247 | A1* | 2/2013 | Gong et al. | 370/311 |

FOREIGN PATENT DOCUMENTS

| | | |
|---|---|---|
| KR | 10-2008-0053174 | 6/2008 |
| KR | 10-2008-0053195 | 6/2008 |
| WO | WO 2008/069626 A1 | 6/2008 |
| WO | WO2008069626 | * 12/2008 |

* cited by examiner

*Primary Examiner* — Kwang B Yao
*Assistant Examiner* — Syed M Bokhari
(74) *Attorney, Agent, or Firm* — McDermott Will & Emery LLP

(57) ABSTRACT

A wireless communications terminal includes: an RF wake-up detection unit detecting a first RF signal including an RF ID for waking up; and a wireless communications unit waking up when the RF ID included in the first RF signal detected by the RF wake-up detection unit matches a pre-set reference ID in a sleep mode.

5 Claims, 4 Drawing Sheets

WIRELESS COMMUNICATIONS TERMINAL HAVING RF DIRECT WAKEUP FUNCTION AND WAKEUP METHOD THEREOF

CROSS-REFERENCE TO RELATED APPLICATIONS

This application claims the priority of Korean Patent Application No. 10-2011-0111495 filed on Oct. 28, 2011, in the Korean Intellectual Property Office, the disclosure of which is incorporated herein by reference.

BACKGROUND OF THE INVENTION

1. Field of the Invention

The present invention relates to a wireless communications terminal having an RF direct wakeup function capable of waking up independently by using an RF ID without performing a demodulation function, and a wakeup method thereof.

2. Description of the Related Art

In general, a wide variety of articles and products are displayed on display shelves or stands in large discount shops or department stores, and information regarding, or prices of corresponding goods may be displayed above or below goods displayed on the display shelves.

Such product information or prices may be printed on a slip of paper (provided on adhesive labels) or may be written on a slip of paper with a pen.

However, as for such a display method, when the goods displayed on the display stands are changed or the prices of goods are changed, a shop manager must replace the slip of paper (or adhesive labels) with information about and prices of goods marked thereon, while physically making a round of the display stands, which is considerably cumbersome and wastes manpower and time.

In particular, in case of large discount stores, since the prices of goods are frequently changed, it is difficult to quickly replace the slip of paper (adhesive labels) while making a round of the display stands.

In order to solve such a problem, a bi-directional wireless electronic information display device capable of transmitting and receiving a price of or information regarding a corresponding article according to a wireless communications scheme, such as infrared data association (IrDA), an RF communications scheme, or the like, may be used.

In general, the wireless electronic information display device may employ a wireless communications module for wireless communications and a liquid crystal display (LCD) module for displaying electronic information, and here, when a battery is employed to use the wireless communications module and the LCD module, since a power capacity of the battery is limited, the wireless communications module uses a sleep mode to lengthen a battery usage time. Namely, the wireless communications module repeatedly wakes up at a certain time to perform a predetermined operation.

As described above, in order to lengthen the battery usage time in the existing wireless communications module, a duration of the sleep mode may be lengthened, but since communications are not possible in the sleep mode, if the duration of the sleep mode is too long, it may be difficult to rapidly perform communications when necessary.

SUMMARY OF THE INVENTION

An aspect of the present invention provides a wireless communications terminal having an RF direct wakeup function capable of directly waking up by using an RF ID without performing a demodulation function, and a wakeup method thereof.

According to an aspect of the present invention, there is provided a wireless communications terminal including: an RF wake-up detection unit detecting a first RF signal including an RF ID for waking up; and a wireless communications unit waking up when the RF ID included in the first RF signal detected by the RF wake-up detection unit matches a pre-set reference ID in a sleep mode.

The RF wake-up detection unit may include: an RF rectifying unit rectifying the first RF signal; and a level conversion unit converting a signal level from the rectifying unit into a signal level that can be recognized by the wireless communications unit.

The wireless communications unit may include: a communication unit performing wireless communications with a pre-set second RF signal; and a controller controlling wireless communications through the communication unit, wherein the controller may include: a sleep logic unit generating a wake-up signal when the RF ID included in the first RF signal detected by the RF wake-up detection unit matches the pre-set reference ID; and a microprocessor waking up by the wake-up signal from the sleep logic unit and controlling wireless communications through the communication unit.

When the level of the first RF signal is a pre-set reference level or higher during a predetermined interrupt recognition time interval, the sleep logic unit may recognize the level of the first RF signal as a wake-up interrupt signal and, thereafter, the sleep logic unit may recognize the level of the first RF signal as one of level 1 and level 0 at every unit time interval included in a predetermined ID recognition time duration.

The sleep logic unit may determine the level of the first RF signal as one of a high level and a low level at a pre-set clock period with respect to each of the plurality of unit time intervals, and when the high levels within the respective unit time intervals are a pre-set number or greater, the sleep logic unit may recognize them as level 1, or otherwise, as level 0.

The sleep logic unit may determine the level of the first RF signal as one of a high level and a low level at a pre-set clock period with respect to each of the plurality of unit time intervals, and when the levels of the first RF signal within the respective unit time intervals are all high levels, the sleep logic unit may recognize them as level 1, or otherwise, as level 0.

According to another aspect of the present invention, there is provided a wake-up method of a wireless communications terminal, including: an interrupt recognizing step of recognizing a wake-up interrupt signal included in a first RF signal in a sleep mode; an ID recognizing step of recognizing an RF ID included in the first RF signal followed by the wake-up interrupt signal, when the wake-up interrupt signal is recognized; an ID determining step of determining whether the RF ID matches a pre-set reference ID; a signal generation step of generating a wake-up signal when the RF ID matches the pre-set reference ID; and a wake-up step of waking the wireless communications terminal up by the wake-up signal.

The method may further include: an RF detection step of detecting a first RF signal including an RF ID for waking up, before the interrupt recognizing step.

In the interrupt signal recognizing step, when the level of the first RF signal is a pre-set reference level or higher during a predetermined interrupt recognition time interval, the first RF signal may be recognized as a wake-up interrupt signal.

In the ID recognizing step, the level of the first RF signal may be recognized as one of level 1 and level 0 at every unit time interval included in a predetermined ID recognition time duration.

In the ID recognizing step, the level of the first RF signal may be determined as one of high level and low level at a pre-set clock period with respect to each of the plurality of unit time intervals, and when the high levels within the respective unit time intervals are a pre-set number or greater, the high levels may be recognized as level 1, or otherwise, as level 0.

In the ID recognizing step, the level of the first RF signal may be determined as one of high level and low level at a pre-set clock period with respect to each of the plurality of unit time intervals, and when the levels of the first RF signal within the respective unit time intervals are all high levels, the high levels may be recognized as level 1, or otherwise, as level 0.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
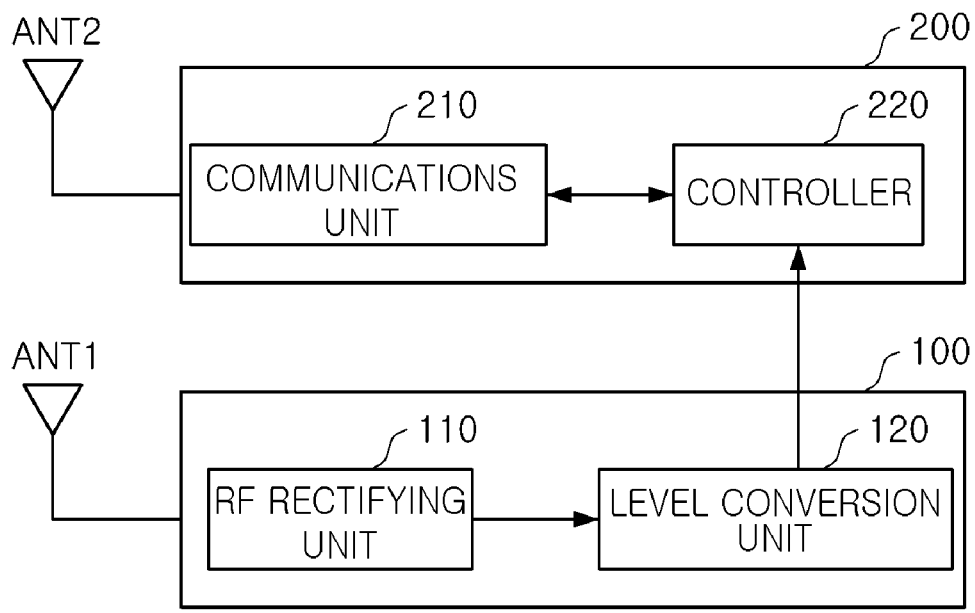
FIG. 1 is a schematic block diagram of a wireless communications terminal according to an embodiment of the present invention.

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like components.

FIG. 1 is a schematic block diagram of a wireless communications terminal according to an embodiment of the present invention.

With reference to FIG. 1, a wireless communications terminal according to an embodiment of the present invention may include an RF wake-up detection unit 100 detecting a first RF signal including an RF ID for waking up, and a wireless communications unit 200 wakes up when the RF ID included in the first RF signal detected by the RF wake-up detection unit 100 matches a pre-set reference ID in a sleep mode.

The operation of the wireless communications terminal will be described with reference to FIG. 1. The RF wake-up detection unit 100 may detect a first RF signal including an RF ID for waking up and provide the detected first RF signal to the wireless communications unit 200. Here, the first RF signal includes a wake-up interrupt signal indicating a start of a wake-up signal and an RF ID having a pre-set certain signal level.

When the RF ID included in the first RF signal detected by the RF wake-up detection unit 100 matches the pre-set reference ID in the sleep mode, the wireless communications unit 200 wakes up. Here, the RF ID included in the first RF signal may be configured as a combination of level 1 and level 0 expressed as an RF signal level.

The RF wake-up detection unit 100 may include an RF rectifying unit 110 rectifying the first RF signal and a level conversion unit 120 converting a signal level from the RF rectifying unit 110 into a signal level that can be recognized by the wireless communications unit 200.

Referring to the RF wake-up detection unit 100, with reference to FIG. 1, the RF rectifying unit 110 may rectify the first RF signal input through a first antenna ANT1 and output the rectified first RF signal to the level conversion unit 120.

The level conversion unit 120 may convert a signal level from the rectifying unit 110 in a pre-set level range that can be recognized by the wireless communications unit 200, into a signal level corresponding to the signal level from the rectifying unit 110.

Figure 2:
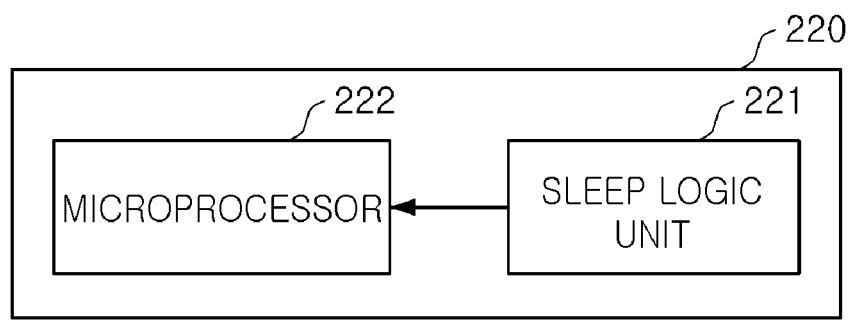
FIG. 2 is an internal block diagram of a controller according to an embodiment of the present invention.

FIG. 2 is an internal block diagram of a controller according to an embodiment of the present invention.

With reference to FIG. 2, the wireless communications unit 200 may include a communication unit 210 performing wireless communications by a pre-set second RF signal and a controller 220 controlling wireless communications through the communication unit 210, wherein the controller 220 comprises a sleep logic unit 221 generating a wake-up signal when the RF ID included in the first RF signal detected by the RF wake-up detection unit 100 matches the pre-set reference ID and a microprocessor 222 waking up by the wake-up signal from the sleep logic unit 221 and controlling wireless communications through the communication unit 210.

Referring to the RF wake-up detection unit 100 and the controller 220, with reference to FIGS. 1 and 2, when an RF signal ID included in the first RF signal detected by the RF wake-up detection unit 100 matches the pre-set reference ID in the sleep mode, a sleep logic unit 221 may generate a wake-up signal.

A microprocessor 222 may wake up according to a wake-up signal from the sleep logic unit 2221 to control wireless communications through the communication unit 210.

Figure 3:
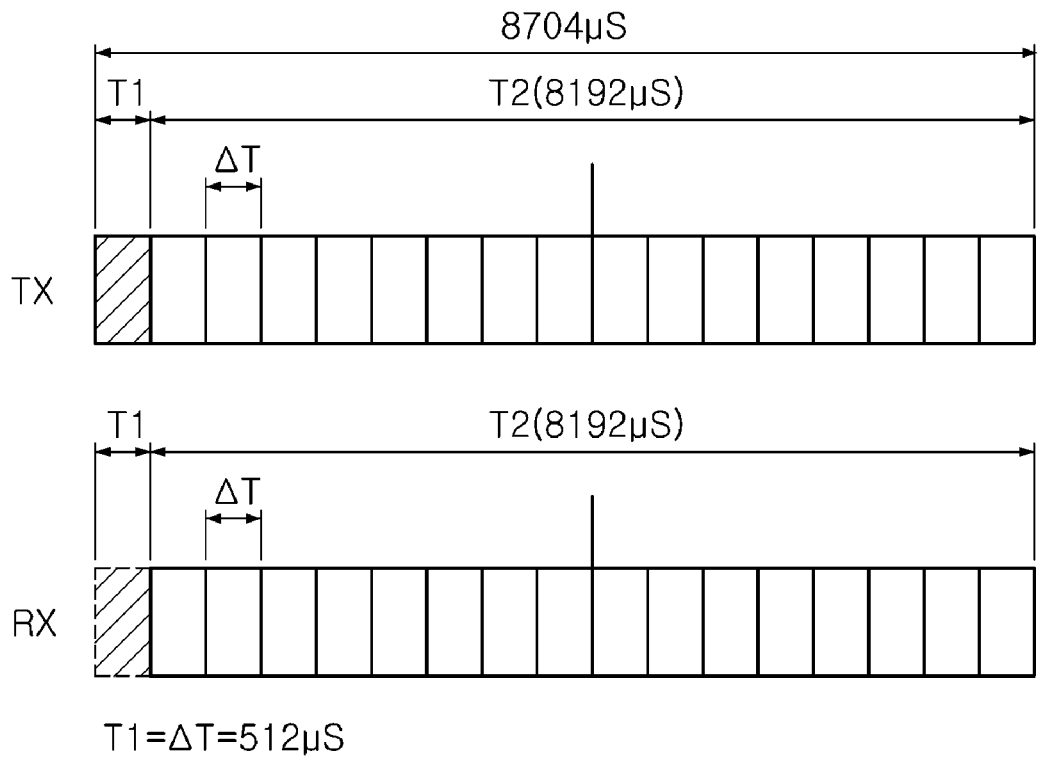
FIG. 3 is a view showing a transmission RF signal (TX) and a reception RF signal (RX) according to an embodiment of the present invention.
Figure 4:
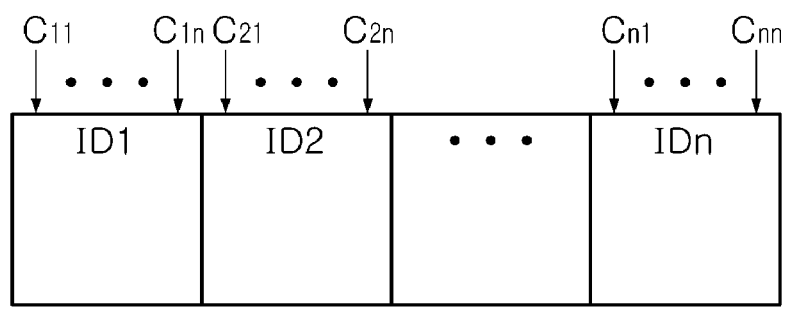
FIG. 4 is a view showing a clock period explaining a plurality of unit time intervals ⌊T and levels according to an embodiment of the present invention.
Figure 5:
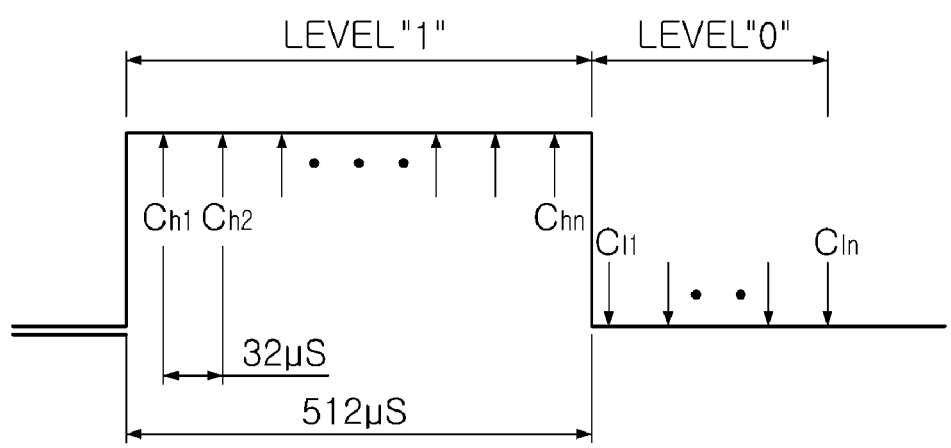
FIG. 5 is a view showing level '1' or level '0' within the plurality of unit time intervals ⌊T according to an embodiment of the present invention.

FIG. 3 is a view showing a transmission RF signal (TX) and a reception RF signal (RX) according to an embodiment of the present invention. FIG. 4 is a view showing a clock period explaining a plurality of unit time intervals ⌊T and levels according to an embodiment of the present invention. FIG. 5 is a view showing level '1' or level '0' within the plurality of unit time intervals ⌊T according to an embodiment of the present invention.

First, with reference to FIG. 3, when an RF ID included in an RF signal is comprised of an interrupt recognition time interval T1 and an ID recognition time duration T2 having 16 unit time intervals ⌊T, it is assumed that the overall time including the recognition time interval T1 and the ID recognition time duration T2 is 8704 uS and the interrupt recognition time interval T1 and the unit time interval ⌊T are equal. Thus, the unit time interval ⌊T can be 512uS(=8704/17=8192/16).

With reference to FIG. 4, the RF ID may be comprised of a plurality of ID levels (ID1,ID2,ID3, . . . , IDn), each having a unit time interval ⌊T in the ID recognition time duration T2.

For example, as mentioned above, the RF ID may be comprised of 16 ID levels (ID1, ID2, ID3, . . . , ID16) each having a unit time interval ⌊T in the ID recognition time duration T2.

At this time, each of the plurality of ID levels (ID1, ID2, ID3, . . . , IDn) may determine the level of the first RF signal as one of a 'high level' and a 'low level' by a pre-set clock (Cnn) period.

With reference to FIG. 5, levels are checked by the pre-set clock (Cnn) period within the unit time interval ⌊T. For example, when the unit time interval ⌊T is 512 uS and the clock (Cnn) period is 32 uS, levels can be checked twelve times.

With reference to FIGS. 3 through 5, when the level of the first RF signal is a pre-set reference level or higher during the predetermined interrupt recognition time interval T1, the sleep logic unit 221 may recognize the level of the first RF signal as a wake-up interrupt signal.

Thereafter, the sleep logic unit 221 may recognize the level of the first RF signal as one of level 1 and level 0 at every unit time interval ⌊T included in the predetermined ID recognition time duration T2.

Here, the sleep logic unit 221 determines the level of the first RF signal as one of a high level and a low level at a pre-set clock Cnn period with respect to each of the plurality of unit time intervals ⌊T. In detail, the sleep logic unit 221 recognizes level 1 and level 0 in the following manner.

For example, as shown in FIG. 5, when all of the levels of the first RF signal are high within the respective unit time intervals ⌊T, the sleep logic unit 221 may recognize them as level 1, or otherwise, as level 0.

In another example, when the high levels within the respective unit time intervals ⌊T are of a pre-set number or greater, the sleep logic unit 221 may recognize them as level 1, or otherwise, as level 0.

Figure 6:
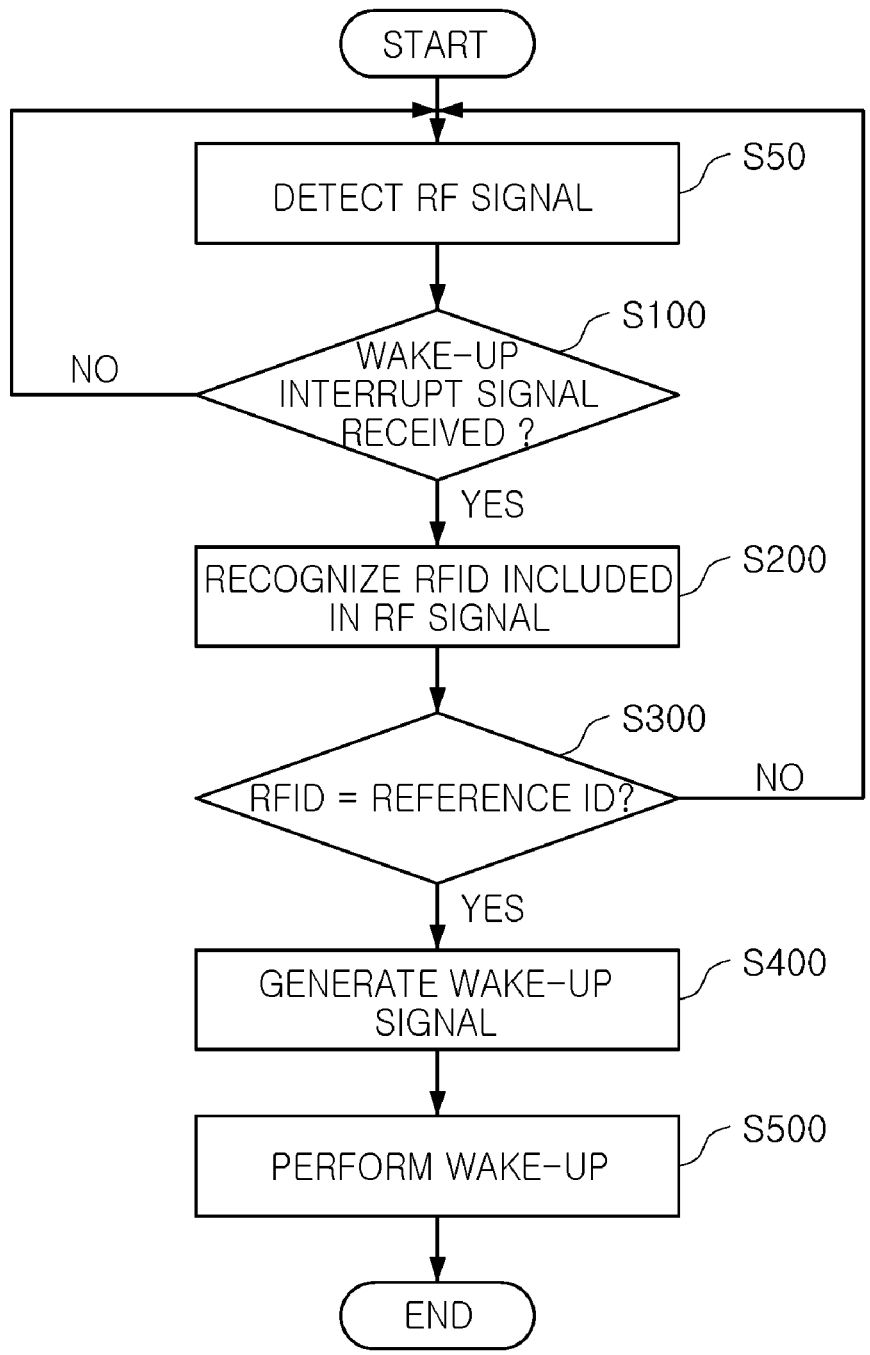
FIG. 6 is a flow chart illustrating a process of a wakeup method of a wireless communications terminal according to an embodiment of the present invention.

FIG. 6 is a flow chart illustrating a process of a wakeup method of a wireless communications terminal according to an embodiment of the present invention.

With reference to FIGS. 1 through 6, a wake-up method of a wireless communications terminal according to an embodiment of the present invention may include an interrupt recognizing step (S100) of recognizing a wake-up interrupt signal included in a first RF signal in a sleep mode, an ID recognizing step (S200) of recognizing an RF ID included in the first RF signal followed by the wake-up interrupt signal, when the wake-up interrupt signal is recognized, an ID determining step (S300) of determining whether the RF ID matches a pre-set reference ID, a signal generation step (S400) of generating a wake-up signal when the RF ID matches the pre-set reference ID, and a wake-up step (S500) of waking the wireless communications terminal up by the wake-up signal.

Also, the wake-up method of a wireless communications terminal according to an embodiment of the present invention may further include an RF detection step (S50) of detecting a first RF signal including an RF ID for waking up, before the interrupt recognizing step.

The wake-up method of a wireless communications terminal according to an embodiment of the present invention will now be described. First, in the RF detecting step (S50), the RF wake-up detection unit 100 illustrated in FIG. 1 may detect a first RF signal including an RF ID for waking up and provide the detected first RF signal to the interrupt recognizing step (S100).

Next, in the interrupt recognizing step (S100), the controller 200 illustrated in FIG. 1 may recognize a wake-up interrupt signal included in the first RF signal in a sleep mode.

And then, in the ID recognizing step (S200), when the wake-up interrupt signal is recognized, an RF ID included in the first RF signal followed by the wake-up interrupt signal may be recognized.

Thereafter, in the ID determining step (S300), it may be determined whether the RF ID matches a pre-set reference ID.

Subsequently, in the signal generating step (S400), when the RF ID matches the pre-set reference ID, a wake-up signal may be generated.

Then, in the wake-up step (S500), the wireless communications terminal may wake up by the wake-up signal.

Also, with reference to FIG. 6, in the interrupt signal recognizing step (S100), when the level of the first RF signal is a pre-set reference level or higher during the predetermined interrupt recognition time interval T1, the first RF signal may be recognized as a wake-up interrupt signal.

With reference to FIGS. 3 through 6, in the ID recognizing step (S200), the level of the first RF signal may be recognized as one of level 1 and level 0 at every unit time interval ⌊T included in the predetermined ID recognition time duration T2, and here, the foregoing description with reference to FIGS. 3 through 5 may be used.

For example, in the ID recognizing step (S200), the level of the first RF signal is determined to be one of high level and low level at a pre-set clock Cnn period with respect to each of the plurality of unit time intervals ⌊T, and when the levels of the first RF signal within the respective unit time intervals are all high, they are recognized as level 1, or otherwise, as level 0.

In another example, in the ID recognizing step (S200), the level of the first RF signal is determined to be one of high level and low level at a pre-set clock Cnn period with respect to each of the plurality of unit time intervals ⌊T, and when the high levels of the first RF signal within the respective unit time intervals are a pre-set number or greater, they may be recognized as level 1, or otherwise, as level 0.

In the present embodiment as described above, an ID of the wireless communications terminal can be discriminated by using the manual wake-up function without power consumption, and accordingly, each wireless communications terminal (or node) can be operated at a short distance, an RF ID can be identified with low power, and wake-up reliability can be remarkably enhanced.

Also, the area implemented as a CMOS has a minimum size so as to be applied to various systems on chip (SoCs), there is no limitation in a frequency band in use, and the wireless communications terminal can be used in every frequency band.

As set forth above, according to embodiments of the invention, the wireless communications terminal can directly wake up by using an RF ID without executing a demodulation function, and an ID of a wireless communications terminal can be identified using a manual wake-up function, and accordingly, each wireless communications terminal (node) can be operated at a short distance, an RF ID can be discriminated with low power, and the wake-up reliability can be remarkably enhanced.

While the present invention has been shown and described in connection with the embodiments, it will be apparent to those skilled in the art that modifications and variations can be made without departing from the spirit and scope of the invention as defined by the appended claims.

What is claimed is:

1. A wireless communications terminal comprising:
an RF wake-up detection unit detecting a first RF signal including an RF ID for waking up; and
a wireless communications unit waking up when the RF ID included in the first RF signal detected by the RF wake-up detection unit matches a pre-set reference ID in a sleep mode,
wherein the wireless communications unit comprises:
a communications unit performing wireless communications with a pre-set second RF signal; and
a controller controlling wireless communications through the communication unit, wherein the controller comprises:
a sleep logic unit generating a wake-up signal when the RF ID included in the first RF signal detected by the RF wake-up detection unit matches the pre-set reference ID; and
a microprocessor waking up by the wake-up signal from the sleep logic unit and controlling wireless communications through the communications unit, and
wherein after the sleep logic unit recognizes the level of the first RF signal as a wake-up interrupt signal, the sleep logic unit determines the level of the first RF signal as one of a high level and a low level at a pre-set clock period with respect to each of the plurality of unit time intervals, and when the levels of the first RF signal within the respective unit time intervals are all high levels, the sleep logic unit recognizes them as level 1, or otherwise, as level 0.

2. The wireless communications terminal of claim 1, wherein the RF wake-up detection unit comprises:
an RF rectifying unit rectifying the first RF signal; and
a level conversion unit converting a signal level from the rectifying unit into a signal level that can be recognized by the wireless communications unit.

3. The wireless communications terminal of claim 1, wherein when the level of the first RF signal is a pre-set reference level or higher during a predetermined interrupt recognition time interval, the sleep logic unit recognizes the level of the first RF signal as a wake-up interrupt signal.

4. A wake-up method of a wireless communications terminal, the method comprising:
an interrupt recognizing operation of recognizing a wake-up interrupt signal included in a first RF signal in a sleep mode;
an ID recognizing operation of recognizing an RF ID included in the first RF signal followed by the wake-up interrupt signal, when the wake-up interrupt signal is recognized;
an ID determining operation of determining whether the RF ID matches a pre-set reference ID;
a signal generation operation of generating a wake-up signal when the RF ID matches the pre-set reference ID;
a wake-up operation of waking the wireless communications terminal up by the wake-up signal; and
an RF detection operation of detecting a first RF signal including an RF ID for waking up, before the interrupt recognizing operation,
wherein, when the first RF signal is recognized as a wake-up interrupt signal in the interrupt recognizing operation, the level of the first RF signal is determined in the ID recognizing operation as one of high level and low level at a pre-set clock period with respect to each of a plurality of unit time intervals included in a predetermined ID recognition time duration, and when the levels of the first RF signal within the respective unit time intervals are all high levels, the high levels are recognized as level 1, or otherwise, as level 0.

5. The method of claim 4, wherein, in the interrupt signal recognizing operation, when the level of the first RF signal is a pre-set reference level or higher during a predetermined interrupt recognition time interval, the first RF signal is recognized as a wake-up interrupt signal.

* * * * *